2,914,510

CERTAIN NOVEL AMPHOTERIC POLYELECTROLYTES

Leo L. Contois, Jr., Corpus Christi, Tex., assignor to Monsanto Chemical Company, St. Louis, Mo., a corporation of Delaware No Drawing. Application November 16, 1955
Serial No. 547,302

10 Claims. (Cl. 260—78)

The present invention relates to novel amphoteric polyelectrolytes and to methods for preparing same. More particularly, the present invention relates to partial hydrazides of carboxyl group containing polymers.

Polymeric materials containing ionizable functional groups are known compounds and are referred to generically as polyelectrolytes. The best known of the polyelectrolytes contain acidic functional groups such as the carboxyl group and the sulfonic acid group. When these compounds ionize in water, the polymeric chain becomes an anion and such ionized polymers frequently are referred to as polyanions. Polyelectrolytes which contain basic groups such as amine groups are also known. When these compounds ionize in water, the polymeric chain becomes a cation and such ionized polymers are referred to as polycations. To date, however, few synthetic polymeric materials which will ionize in both acidic and basic solutions have been available, although for a number of reasons it would be highly desirable to have such polymers. For example, such polymers in general would be soluble in both acidic and basic solutions.

It is an object of this invention to provide novel polyelectrolytes.

Another object of this invention is to provide novel polyelectrolytes which will ionize in both acidic and basic solutions.

Other objects and advantages of this invention will become apparent from the following detailed description thereof.

It has been discovered that polyelectrolytes which will ionize in both acidic and basic solutions can be prepared by reacting in alkali-soluble carboxyl group containing polymer with an N,N-di-substituted hydrazine. Because the polymers of this invention will ionize differently in acidic and basic media, they will be referred to a polyampholytes. A typical example of the compounds of the present invention is that obtained by reacting an ethylene-maleic anhydride interpolymer with N,N-dimethylhydrazine.

The following examples are set forth to more clearly illustrate the principle and practice of this invention to those skilled in the art. All parts are by weight.

Example I

Thirteen parts of an ethylene-maleic anhydride interpolymer containing ethylene and maleic anhydride in an equimolar ratio is suspended in 200 parts of benzene and heated to reflux. Six parts of N,N-dimethylhydrazine is added dropwise with stirring over a period of fifteen minutes. The quantity of N,N-dimethylhydrazine added is sufficient to react with 50% of the carboxyl groups of the polymer. Stirring and reflux are continued for a period of six hours to complete the reaction and the solid reaction product is recovered by filtration. The product is soluble in water, dilute ammonium hydroxide and dilute hydrochloric acid.

Example II

Example I is repeated except that the N,N-dimethylhydrazine is replaced with 8 parts of N,N-diethylhydrazine. The product is soluble in water, dilute ammonium hydroxide and dilute hydrochloric acid.

Example III

Example I is repeated except that the N,N-dimethylhydrazine is replaced with 15 parts of N-phenyl, N-methylhydrazine. The product is soluble in water, dilute ammonium hydroxide and dilute hydrochloric acid.

Example IV

Example I is repeated except that the ethylene-maleic anhydride interpolymer is replaced with 15 parts of an isobutylenemaleic anhydride interpolymer containing isobutylene and maleic anhydride in an equimolar ratio. The product is soluble in water, dilute ammonium hydroxide and dilute hydrochloric acid.

Example V

Example I is repeated except that the ethylene-maleic anhydride interpolymer is replaced with 21 parts of an interpolymer containing 1 molar portion of styrene, 0.8 molar portion of maleic anhydride and 0.2 molar portion of the half methyl ester of maleic acid. The product is soluble in water, dilute ammonium hydroxide and dilute hydrochloric acid.

Example VI

Example V is repeated except that toluene is used in lieu of benzene as the reaction medium and the quantity of N,N-dimethylhydrazine employed is sufficient to react with 60% of the carboxyl groups of the interpolymer. The product is readily soluble in water and dilute hydrochloric acid and sparingly soluble in dilute ammonium hydroxide.

Example VII

Example I is repeated except that the ethylene-maleic anhydride interpolymer is replaced with 16 parts of an interpolymer containing 1 molar portion of vinyl acetate, 0.6 molar portion of maleic acid and 0.4 molar portion of the half methyl ester of maleic acid. The product is hygroscopic and is soluble in water, dilute ammonium hydroxide and dilute hydrochloric acid.

Example VIII

Example I is repeated except that the ethylene-maleic anhydride interpolymer is replaced with 14 parts of an interpolymer containing vinyl methyl ether and maleic anhydride in an equimolar ratio. The product is soluble in water, dilute ammonium hydroxide and dilute hydrochloric acid.

Example IX

Example I is repeated except that the ethylene-maleic anhydride interpolymer is replaced with 14 parts of polyacrylic acid. The product is soluble in water, dilute ammonium hydroxide and dilute hydrochloric acid.

Example X

Example I is repeated except that the ethylene-maleic anhydride interpolymer is replaced with 34 parts of an interpolymer containing methacrylic acid and vinyl acetate in an equimolar ratio. In addition, the benzene reaction medium is replaced with xylene. The product is soluble in water, dilute ammonium hydroxide and dilute hydrochloric acid.

Example XI

Example X is repeated except that the vinyl acetate-methacrylic acid interpolymer is replaced with 24 parts of an interpolymer containing 30 weight percent butadiene and 70 weight percent methacrylic acid. The product is soluble in water, dilute ammonium hydroxide and dilute hydrochloric acid.

Essentially any alkali-soluble carboxyl group containing polymer can be used in the preparation of the polyampholytes of this invention, although obviously the properties of the final polyampholyte will be somewhat dependent upon the particular carboxyl group containing polymer employed in its preparation. The number of carboxyl groups contained in the alkali-soluble polymer will be in excess of the number required to render it alkali-soluble, since a substantial portion of the carboxyl groups will be reacted with the N,N-di-substituted hydrazine in the preparation of the polyampholytes. The precise number of the carboxyl groups required in the alkali-soluble polymer will vary widely depending upon the nature of the polymer containing the carboxyl groups and also upon the degree of reaction with the N,N-di-substituted hydrazine subsequently employed in the preparation of the polyampholyte. When carboxyl groups are incorporated in an essentially polyvinyl acetate polymer, as by interpolymerizing a carboxyl group containing monomer with vinyl acetate, only a small number of carboxyl groups are required as polymers of vinyl acetate are relatively hydrophilic. When, however, carboxyl groups are incorporated in an essentially hydrocarbon polymer, as by interpolymerizing a carboxyl group containing monomer with butadiene, a substantial number of carboxyl groups is required to solubilize the interpolymer. In general, one carboxyl group should be present for each 2 or 3 monomeric units contained in the polymer chain. Henceforth, whenever reference is made to a carboxyl group containing polymer it will be understood that it contains sufficient carboxyl groups to be alkali-soluble. For the purpose of this invention, a polymer is considered to be alkali-soluble if 1% of the polymer will dissolve in 5% NaOH at 20° C.

The alkali-soluble carboxyl group containing polymers can be prepared in many ways. The most convenient method for preparing such polymers is to simply homopolymerize or interpolymerize a carboxyl containing vinylidene monomer such as acrylic acid, methacrylic acid, crotonic acid, itaconic acid, sorbic acid, etc. Typical examples of such carboxyl group containing polymers include polyacrylic acid, polymethacrylic acid, interpolymers of acrylic or methacrylic acid with monomers such as vinyl chloride, styrene, alpha-methylstyrene, butadiene, vinyl acetate, acrylate esters, etc.

The carboxyl group containing polymers that are preferred for use in the present invention are interpolymers of maleic anhydride, maleic acid, half esters of maleic acid and mixtures thereof. In addition to the maleic compound, such interpolymers contain an interpolymerizable compound which, when in the monomeric form, contains the vinylidene grouping $CH_2=C<$. Preferably the vinylidene grouping is free of reactive functional groups such as hydroxyl groups, carboxyl groups, amide groups, amino groups, etc. Typical comonomers that may be interpolymerized with the maleic compound include vinyl halides, e.g., vinyl chloride, vinyl bromide; olefins, e.g., ethylene, isobutylene, amylene; vinyl esters of carboxylic acids, e.g., vinyl acetate, vinyl propionate, vinyl butyrate, vinyl benzoate; vinyl aromatic compounds, e.g., styrene, o-chlorostyrene, 2,5-dichlorostyrene, 2,4-dichlorostyrene, p-ethylstyrene, divinyl benzene, vinyl naphthalene, alpha-methylstyrene; vinyl ethers, e.g., vinyl methyl ether, vinyl isobutyl ether, and the like. It is possible to use maleic interpolymers of widely varying molecular weight, although it is preferred to employ interpolymers having a specific viscosity of at least 0.1 as determined in a 1% solution of dimethylformamide at 25° C. Such specific viscosities are calculated in accordance with the well known equation:

$$\text{Specific viscosity} = \frac{\text{solution viscosity} - \text{solvent viscosity}}{\text{solvent viscosity}}$$

The preparation of such interpolymers is well known in the art and in general the interpolymer will contain the maleic compound and the interpolymerizable monomer in substantially equimolar proportions.

The polyampholytes of this invention are prepared by reacting the carboxyl group containing polymers described above with an N,N-di-substituted hydrazine of the formula:

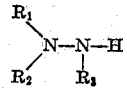

where: $R_1$ and $R_2$ are independently selected from the group consisting of alkyl, aralkyl, aryl and alkaryl groups and $R_3$ is selected from the group consisting of hydrogen, alkyl, aralkyl, aryl and alkaryl radicals. Typical examples of such N,N-di-substituted hydrazines include N,N-dimethylhydrazine, N,N-diethylhydrazine, N,N-dibutylhydrazine, N-methyl, N-hexylhydrazine, N,N-di(2-ethylhexyl)hydrazine, N,N-diphenylhydrazine, N-methyl, N-propylhydrazine, etc.

The reaction of the carboxyl group containing polymer with the N,N-di-substituted hydrazine is preferably effected in a liquid reaction medium that is a solvent for the N,N-di-substituted hydrazine and essentially a nonsolvent for the carboxyl group containing polymer, the reaction being carried out under conditions such that any water formed in the reaction is removed as formed. Ideally, the reaction medium employed should fulfill the following conditions:

(1) It should be immiscible with water, but form an azeotrope therewith so that water formed in the reaction can be removed from the reaction zone by azeotropic distillation.

(2) It should be essentially a nonsolvent for the carboxyl group containing polymer.

(3) It should be a solvent for the N,N-di-substituted hydrazine.

(4) It should not react with either the carboxyl group containing polymer or the N,N-di-substituted hydrazine.

The lower aromatic hydrocarbon solvents such as benzene and toluene are excellent reaction media in that they are particularly efficacious in azeotropically removing water of reaction from the reaction zone as it is formed. Where the carboxyl groups of the carboxyl group containing polymer are present in the form of an anhydride, as is the case when employing interpolymers of maleic anhydride, no water will be formed in the reaction and non-water azeotroping solvents may be employed if desired.

The quantity of N,N-di-substituted hydrazine reacted with the carboxyl group containing polymer can be varied widely and the properties of the polyampholyte will be somewhat dependent upon the quantity employed. In general, the N,N-di-substituted hydrazine employed will be sufficient to react with 15–85% of the carboxyl groups of the polymer and preferably with 35–65% of the carboxyl groups. Optimum results are obtained when 40–60% of the carboxyl groups of the polymer are reacted with the N,N-di-substituted hydrazine.

The polyampholytes prepared by the method of this invention have utility in many diverse industrial fields. They are excellent flocculating agents for solids suspended in aqueous solutions and may be employed in beer and soft drink manufacturing processes, in sugar refining, in sewage treatment, etc. The polyampholytes also may be used as soil conditioners, and as additives to oil well drilling muds.

The above descriptions and particularly the examples are set forth by way of illustration only. It will be

What is claimed is:

1. A water soluble, essentially linear polymer of at least one carboxyl group-containing alpha, beta-ethylenically unsaturated monomer, said polymer having chemically bonded to carbon atoms of the polymer chain both carboxyl groups of said monomer of the formula:

—COOH and carboxyl groups of said monomer reacted with an unsymmetrical disubstituted hydrazine to form hydrazide groups of the formula:

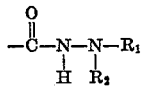

where $R_1$ and $R_2$ are independently selected from the group consisting of alkyl, aralkyl, aryl and alkaryl radicals; the number of hydrazide groups constituting 15–85% of the total number of carboxyl groups and hydrazide groups; the total number of carboxyl groups and hydrazide groups in the polymer being equal to the number of the carboxyl groups of the carboxyl group-containing alpha, beta-ethylenically unsaturated monomer contained in the polymer prior to reaction with the unsymmetrical disubstituted hydrazine.

2. The compositions of claim 1 in which the polymer of at least one carboxyl group-containing alpha, beta-ethylenically unsaturated monomer is an interpolymer of a maleic monomer selected from the group consisting of maleic anhydride, maleic acid, half esters of maleic acid and mixtures thereof and a vinylidene monomer interpolymerizable therewith; said maleic monomer and vinylidene monomer being combined in substantially equimolar proportions.

3. The compositions of claim 1 in which the interpolymer is an interpolymer of ethylene and maleic anhydride.

4. The compositions of claim 1 in which the interpolymer is an interpolymer of styrene and maleic anhydride.

5. The compositions of claim 1 in which the interpolymer is an interpolymer of vinyl acetate and maleic anhydride.

6. The compositions of claim 1 in which the interpolymer is an interpolymer of isobutylene and maleic anhydride.

7. The compositions of claim 1 in which the interpolymer is an interpolymer of vinyl ethyl ether and maleic anhydride.

8. A process for preparing water-soluble polyampholytes which comprises heating an alkali-soluble, essentially linear polymer of at least one carboxyl group-containing alpha, beta-ethylenically unsaturated monomer with an N,N-disubstituted hydrazine in a solvent for the N,N-disubstituted hydrazine that is nonreactive with both the alkali-soluble polymer and the N,N-disubstituted hydrazine; the molar quantity of N,N-disubstituted hydrazine employed being 15–85% of the molar quantity of carboxyl groups contained in said alkali-soluble polymer; said N,N-disubstituted hydrazine conforming to the formula:

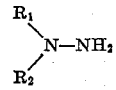

where $R_1$ and $R_2$ are independently selected from the group consisting of alkyl, aralkyl, aryl and alkaryl radicals.

9. A process for preparing water-soluble polyampholytes which comprises the steps: (1) adding an alkali-soluble, essentially linear polymer of at least one carboxyl group-containing alpha, beta-ethylenically unsaturated monomer to a water immiscible organic liquid which forms an azeotrope with water, (2) adding an N,N-disubstituted hydrazine to the mixture from step (1) and (3) heating the reaction mixture from step (2) to a temperature at which any water formed in the reaction is removed from the reaction system as an azeotrope; the water immiscible organic liquid employed in step (1) being characterized by (a) being essentially a nonsolvent for the alkali-soluble polymer, (b) being a solvent for the N,N-disubstituted hydrazine added in step (2) and (c) being nonreactive with both the alkali-soluble polymer and the N,N-disubstituted hydrazine; the molar quantity of N,N-disubstituted hydrazine added in step (2) being 15–85% of the molar quantity of carboxyl groups contained in the alkali-soluble polymer; said N,N-disubstituted hydrazine conforming to the formula:

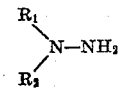

where $R_1$ and $R_2$ are independently selected from the group consisting of alkyl, aralkyl, aryl and alkaryl radicals.

10. The process of claim 9 in which the alkali-soluble, essentially linear polymer of at least one carboxyl group-containing alpha, beta-ethylenically unsaturated monomer is an interpolymer of a maleic monomer selected from the group consisting of maleic anhydride, maleic acid, half esters of maleic acid and mixtures thereof and a vinylidene monomer interpolymerizable therewith; said maleic monomer and vinylidene monomer being combined in substantially equimolar proportions.

References Cited in the file of this patent

UNITED STATES PATENTS

| | | |
|---|---|---|
| 2,451,370 | Alderson | Oct. 12, 1948 |
| 2,764,570 | Kowlik et al. | Sept. 25, 1956 |

UNITED STATES PATENT OFFICE
CERTIFICATE OF CORRECTION

Patent No. 2,914,510                                                  November 24, 1959

Leo L. Contois, Jr.

It is hereby certified that error appears in the printed specification of the above numbered patent requiring correction and that the said Letters Patent should read as corrected below.

Column 1, line 47, for "reacting in" read -- reacting an --; line 51, for "to a" read -- to as --; column 5, line 39, claim 3, line 42, claim 4, line 45, claim 5, line 48, claim 6, and line 51, claim 7, for the claim reference numeral "1", each occurrence, read -- 2 --.

Signed and sealed this 10th day of May 1960.

(SEAL)
Attest:

KARL H. AXLINE                                            ROBERT C. WATSON
Attesting Officer                                         Commissioner of Patents